United States Patent [19]
Allington

[11] 3,887,813
[45] June 3, 1975

[54] SHORT WAVELENGTH FLUORESCENT LIGHT SOURCE

[75] Inventor: Robert W. Allington, Lincoln, Nebr.

[73] Assignee: Instrumentation Specialties Company, Lincoln, Nebr.

[22] Filed: July 24, 1970

[21] Appl. No.: 64,863

Related U.S. Application Data

[60] Division of Ser. No. 654,303, June 26, 1967, abandoned, which is a continuation-in-part of Ser. No. 590,071, Oct. 27, 1966, abandoned.

[52] U.S. Cl. ................. 250/461; 250/504; 313/489
[51] Int. Cl.² ......................................... G01N 21/38
[58] Field of Search ............ 250/71, 77, 88, 80, 84; 313/25, 108, 109; 252/301.8; 240/103; 356/181, 207

[56] References Cited
UNITED STATES PATENTS

| | | | |
|---|---|---|---|
| 2,783,407 | 2/1957 | Vierkötter | 313/109 |
| 2,901,647 | 8/1959 | Thomas et al. | 313/25 |
| 3,054,013 | 9/1962 | Johnson | 313/108 R |
| 3,147,226 | 9/1964 | Jönck | 252/301.3 |
| 3,200,254 | 8/1965 | Luik, Jr. et al. | 356/207 X |

Primary Examiner—Davis L. Willis
Attorney, Agent, or Firm—Vincent L. Carney

[57] ABSTRACT

Devices providing 270–320 m$\mu$ and preferably 280 m$\mu$ fluorescent light are described in which a primary source of shorter wavelength light is incident upon an elongated thallium-activated alkali halide fluorescent crystal having rounded ends serving as lenses to collimate fluorescent light emanating from said ends. Methods and means are also described for prolonging the useful life of the fluorescent crystal, including optical means for filtering out the deleterious wavelengths of the light from the primary source, means for dissipating heat from the crystal to reduce its degrading effect, and a method and means for cleaning and maintaining the crystals free of surface contamination adversely affecting its fluorescent properties.

14 Claims, 4 Drawing Figures

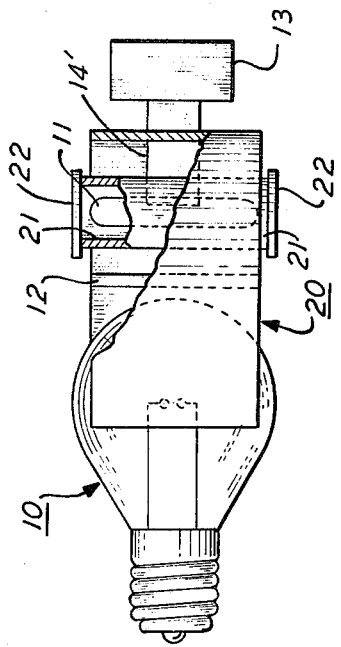
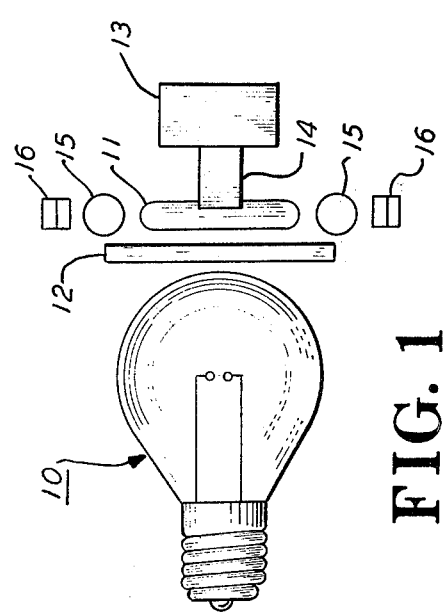
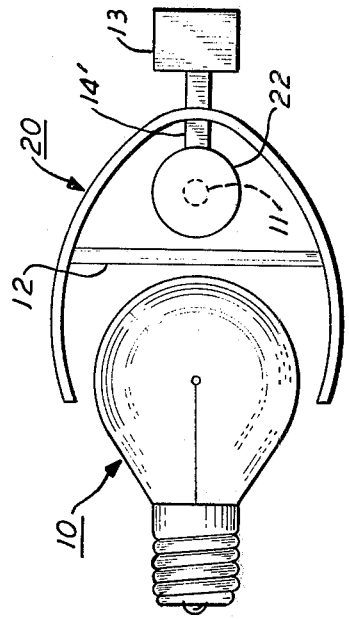
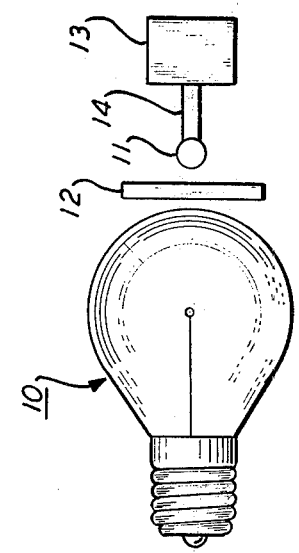
INVENTOR.
ROBERT W. ALLINGTON

SHORT WAVELENGTH FLUORESCENT LIGHT SOURCE

This present application is a continuation-in-part of my earlier co-pending U.S. patent application Ser. No. 590,071, filed Oct. 27, 1966 and now abandoned for short Wavelength Fluorescent Light Source.

BACKGROUND OF THE INVENTION

A source of short wavelength ultraviolet light of about 280 $\mu$ wavelength has numerous applications as is well-known to those skilled in the art, and is particularly useful in photometric apparatus for the measurement of optical density or light absorbance of protein and amino acid solutions. One method of providing such a light source would be to employ a thermally incandescent body in conjunction with a suitable monochromator. This method suffers from the disadvantage that is difficult to maintain a solid body at a temperature sufficiently high to provide a strong radiant flux at 280 $\mu$ wavelength. Another approach to the problem would be to select a strong spectral line from the emission line spectrum of an excited element. In order to provide a low cost, stable light source, having a wavelength of about 280 $\mu$ and a practical level of intensity, it would be necessary to select an element for excitation having both a strong emission line in its spectrum at about the desired wavelength and a low vapor pressure. Unfortunately, no element having both of these properties exists. Consequently, it has previously been the practice to obtain 280 $\mu$ wavelength light either either by using a thermally heated body as noted above or by the use of a continuous-spectrum hydrogen discharge lamp in conjunction with a suitable monochromator. Such systems suffer from the disadvantage that only a small portion of the total energy output of the source is of the desired wavelength, and consequently the remaining unused greater proportion is wasted as heat. It is apparent, therefore, that the need has existed in the art for a low cost, easily operable, long lasting source of light of about 280 $\mu$ wavelength.

BRIEF DESCRIPTION OF THE INVENTION

This invention relates to novel short wavelength fluorescent light sources and, more particularly, to light sources of this type comprising thallium-activated alkali halide fluorescent crystals, to improved crystals of this type, and to methods and means for preserving the fluorescent properties of such crystals. More specifically, the novel short wavelength fluorescent light sources of the invention include a crystal of thallium-activated alkali halide which produces fluorescent light over a wavelength range of about 270–320 $\mu$ when irradiated by shorter wavelength ultraviolet light from a primary source included in the device. In a specific embodiment of the invention, a single large, elongated, thallium-activated alkali halide crystal having rounded ends is employed; the rounded ends acting as lenses to collimate the large proportion of the fluorescent light which emanates from these ends. Other embodiments of the invention include a transparent heat shield interposed between the primary source of ultraviolet light and the crystal, and cooling means associated with the crystal to prolong its operable life by dissipating degrading heat emanating from the primary light source. Optical filtering means are also included in such embodiments of the invention to filter out certain portions of the light in the primary source, particularlly 185 $\mu$ light, which has a tendency to degrade the crystal.

In still another embodiment of the invention the novel short wavelength fluorescent light source includes an elliptical reflector; the elongated crystal being disposed with its axis passing through one focal axis of the reflector and the bright spot of the primary light source coinciding with the other focal axis of the reflector. In this embodiment the crystal is disposed in a sealed tube filled with inert gas. The tube may be of any suitable material completely transparent to the desired light, such as quartz, for example, if an improved crystal of the invention is used. However, if a crystal of previously available type is used the tube may be composed of a material which transmits light having a wavelength longer than about 220 $\mu$ and whicih absorbs light having a wavelength shorter than about 220 $\mu$, thus filtering out any deleterious 185 $\mu$ light from the primary source. A transparent heat shield is also disposed between the primary source and crystal, if necessary.

The invention also includes improved thalliumactivated alkali halide crystals containing $10^{-4}$ to $10^{-6}$ mole fraction of thallium ion with respect to potassium ion. I have discovered that such crystals, when prepared according to known methods, have a tendency to be degraded by heat and light of certain wavelengths, and, therefore, the heat dissipating means and means for filtering out harmful components of the light in the primary source, as noted above, are included in embodiments of the invention employing such crystals. I have made the further unexpected discovery; however, that such crystals are extremely sensitive to surface contamination and this discovery has led to the development of other important embodiments of the invention, i.e. improved crystals of greatly prolonged useful life, a method for the manufacture of such crystals by removing surface contamination of ordinary crystals, and means for protecting the improved decontaminated crystals against recontamination. More specfically thallim-activated alkali halide crystals are preferably washed in hexane, dried, rewashed in methyl alcohol, dried again, placed in sealed protective tubes and spaced from the sides of the tube by inert spacing elements such as rings composed of Teflon (Trademark of E.I. Du Pont De Nemours Co. for polytetrafluoroethylene) and surrounded by an inert atomsphere, such as dry argon. It has been found that such decontaminated and protected crystals are not adversely affected by 254 $\mu$ light or even 185 $\mu$ light at temperatures up to 150°F. Therefore, when such tubed crystals are employed in the light sources of the invention it is possible in some cases to eliminate the heat dissipating and optical filter elements required in embodiments employing crystals prepared according to previously known techniques, the surfaces of which crystals are normally contaminated. While the above washing method employing nonaqueous solvents is preferred, the invention also includes the use of aqueous solvents having solvent action for the alkali halide to cleanse the surface of such crystals.

BRIEF DESCRIPTION OF THE VIEWS OF THE DRAWINGS

In the drawings in which like reference characters designate like parts in the several views:

FIG. 1 is a top plan view of apparatus made in accordance with an embodiment of this invention, including light filtering and heat dissipating means;

FIG. 2 is a side elevational view of the apparatus of FIG. 1, with the optical filters and flow cells omitted;

FIG. 3 is a top plan view apparatus made in accordance with another embodiment of this invention, certain parts being broken away and others shown in cross-section;

FIG. 4 is a side elevational view of the apparatus of FIG. 3.

DETAILED DESCRIPTION OF THE INVENTION

Referring now to FIGS. 1 and 2, a mercury-vapor lamp 10, a primary light source, is disposed proximate to an elongated rod 11 comprising a single crystal of thallium-activated alkali halide. The crystal is formed by growing it from a fuzzed melt of a mixture of suitable salts, for example, thallium chloride and potassium chloride. Because of the marked tendency of the thallium ion to remain in the melt instead of being incorporated into the potassium chloride crystal lattice, a large excess of the thallium chloride above that desired in the crystal, must be present in the melt, for example, to obtain $10^{-5}$ mole fraction, thallium chloride is used in a proportion of about one part per thousand of potassium chloride by weight. Another reason for using a large excess of the thallium salt is because thallium chloride, for example, boils at atmospheric pressure at a temperature slightly below the crystal growing temperature, which temperature is of the order of 785°–795°C. I have found it is important that the thallium concentration in the potassium chloride crystal be about $10^{-4}$ to $10^{-6}$ mole fraction of thallium ion with respect to the potassium ion. More specifically, if the thallium mole fraction is greater than $10^{-4}$, the wavelength of maximum emission of fluorescent light is shifted to longer wavelengths away from the desired 280 $\mu$ value, and the crystal becomes physically weak and difficult to machine and also degrades more rapidly in use. On the other hand, if the thallium mole fraction is less than $10^{-6}$, the fluorescent emission of the crystal is weakened.

The crystals can be grown by any of several known methods, as, for example, by the Kyropoulos method, described in "The Growing of Crystals", by Menzies and Skinner, *Discussions of the Faraday Society, Vol. 5*, 306–312, (1949). However, I modify this method by using a platinum holder for the seed crystal to prevent contamination by nickel as suggested in the cited article. Also the seed crystal holder is supported by Haynes 25 tubing, which is used to cary cooling water to the seed crystal holder, since the Haynes alloy obviates the contaminating corrosion sometimes experienced from stainless steel used by the cited authors.

The mercury-vapor lamp 10 radiates ultraviolet light rich in light having a wavelength of 254 $\mu$, causing the crystal 11 to radiate fluorescent light having a wavelength band of about 270–320 $\mu$. When a long, narrow crystal is used, as shown in FIGS. 1 and 2, a large percentage of the flourescent radiation will emanate from the ends thereof. In order to collimate such end radiations, the ends of the crystals are rounded to form lenses, as shown.

Since thallium activated alkali halide crystals prepared according to previously known methods are degenerated by heat, when such crystals are employed, a transparent heat shield 12 is interposed between the exciting lamp and the crystal. Further, a suitable cooling means 13 and a heat transfer member 14 may be employed to advantage. The member 14 comprises a block material having good thermal conductivity, such as aluminum, and the cooling means 13 may comprise a conventional thermoelectric cooling machanism with a suitable heat sink. Alternatively, water jacketing, forced air, etc., may be used for cooling the crystal. Such heat dissipating means may also be used in conjunction with the improved crystals of the present invention described below, but due to the improved stability of such crystals, are not ordinarily necessary unless the crystal is exposed to temperatures above 150°F.

In apparatus for the measurement of optical density or light absorbance of solutions, the fluorescent radiations emanating from the ends of the crystal 11 are passed through flow cells 15 and optical filters 16 which absorb radiations having wavelengths of 290–320 $\mu$. A filter of this type is disclosed and claimed in my U.S. Pat. No. 3,243,595, issued Mar. 29, 1966, and entitled, "Compound Optical Filter Providing a Sharp Cut-off.".

In the embodiment of the invention shown in FIGS. 1 and 2, only a relatively small fraction of the total light of the primary source lamp 10 strikes the crystal. Also, when used in this way crystals prepared by previously known methods lose their ability to fluoresce strongly after prolonged exposure to the exciting lamp. I have found that with respect to previously available crystals, the latter effect is at least partially due to light produced by the lamp of a wavelength other than that which excites the desired fluorescence of the crystal. Specificaly, light of a spectral line wavelength of 185 $\mu$ degenerates the flluorescent properties of ordinary thallium-activated alkali halide crystals and does not contribute significantly to the fluorescent intensity of such crystals. As a matter of fact, even the desired spectral line wavelength of 254 $\mu$ which produces the desired fluorescence has a tendency to damage previously available crystals, although to a lesser degree than the 185 $\mu$ light. Both of these spectral lines are present in the spectrum of the excited mercury vapor in the lamp 10. Therefore, when using a crystal of the type previously available it is desirable to interpose between the lamp and the crystal a filter which will absorb the undesirable 185 $\mu$ wavelength. One suitable filter for this purpose, which transmits wavelengths longer than 220 $\mu$ and absorbs wavelengths shorter than 220 $\mu$, is composed of a clear, highsilica glass sold under the tradename "Vycor 7910", by Corning Glass Works. The filter can be incorporated in the apparatus in a number of ways as, for example, by making the envelope of the mercury-vapor lamp of this material, by interposing a sheet of the material between the exciting lamp and the fluorescent crystal, or by enclosing the fluorescent crystal within a tube made of the material. It is here pointed out that a filter made of this material is also useful in conjunction with ordinary thallium-activated crystals when such crystals are excited by a source other than a mercury-vapor lamp, for example, a hydrogen lamp which produces a continum of wavelengths in the ultraviolet region.

Reference is now made to FIGS. 3 and 4, which show another embodiment of the invention in which a greater proportion of the output of the primary light source is utlized. The primary light source, mercury vapor lamp 10, is positioned so that its bright spot coincides with one focal axis of an elliptical reflector 20.

The axis of the crystal 11 passes through the other focal axis of the reflector. The crystal is enclosed within a sealed tube 21. The tube 21 may be made of any suitable material completely transparent to the desired light, such as quartz, for example, if it is to enclose one of my improved crystals which do not require protection from 185 $\mu$ light in the source. On the other hand, if a previously available crystal is used, the tube 21 is made of the abovementioned material which transmits rays having a wavelength longer than 220 $\mu$ and absorbs rays having a wavelength shorter than 220 $\mu$. Preferably, the tube 21 is sealed at the ends with discs 22 which transmit 280 $\mu$ light and the tube is filled with a dry, reasonably inert gas, such as dry argon. The heat transfer block 14' passes through an opening formed in the reflector, said block having a concave end in engagement with the thermoelectric cooling mechanism 13. The transparent heat shield 12 extends longitudinally through the reflector and is disposed between the lamp 10 and the crystal 11. As noted above, these heat dissipating means may not be necessary if one of my improved crystals is used and the operating temperature does not exceed about 150°F.

As noted above I have discovered that thallium-activated alkali halide crystals are extremely sensitive to surface contamination, i.e. if the surface of such a crystal is not scrupulously clean the crystal will rapidly lose its fluorescent properties in use. While the nature of the contamination which is the apparent causes of rapid deterioration of the fluorscent properties of such crystals has not been investigated, it is known that certain organic contaminants such as degraded rubber etc., appear to be especially harmful. Knowledge of the exact nature of the harmful contaminants is not necessary to the practice of this invention, however since it is known that crystals obtained by the usual methods of prepartion are normally sufficiently contaminated to materially reduce their useful life, but can be treated according to the method of the present invention to produce uncontaminated crystals having greatly prolonged fluorescent life.

As noted above, the improved uncontaminated crystals of the present invention are obtained by first washing ordinary thallium -activated alkali halide crystals with any suitable solvent to remove the contamination. Such solvents include aqueous solvents having solvent action for the underlying alkali halide crystal, and nonaqueous solvents having solvent action for the contaminants but not the crystal itself. In the preferred method of the crystal is first washed in fresh reagent grade hexane. The crystals are then dried in air by any suitable conventional technique and washed again with fresh reagent grade methyl alcohol. After drying, the decontaminated crystals are handled with clean disposable plastic gloves while fitting them into clean glass tubes; this operation being carried out in an atmosphere of dry argon to prevent recontamination of the crystals. The crystals are so spaced from the walls of the glass tubes by suitable spacers, such as rings of Teflon (DuPont trademark for polytetrafluoroethylene), which are inert to the crystals and to ultraviolet radiation. It is important not to use rubber or similar spacers, since such materials are degraded by ultraviolet radiation and would recontaminate the crystal. The ends of the tube containing the decontaminated crystal are then sealed with discs of glass or other material transparent to 280 $\mu$ wavelength fluorescent light by any suitable means such as fusion of glass to glass. In order for the fluorescent unit to retain its sensitivity in use it is essential that the tube be hermetically sealed or air tight. Inasmuch as the assembly operation is carried out in an enclosure filled with dry argon, the sealed tubes are also filled with this gas, which provides a suitably inert atmosphere to inhibit degradation of the crystal. As noted above decontaminated crystals sealed in sealed tubes such as these retain their phosphorescent strength indefinitely when irradiated by 254 $\mu$ light at temperatures not in excess of about 150°F. and are far less sensitive to heat and even deleterious 185 $\mu$ light than crystals which have not been cleaned according to the present invention. Therefore, the heat dissipating means and optical filtering means described above are generally not necessary when these improved, highly stable crystals are used.

When reference is made to thallium, in the foregoing description, it is understood that thallium in the "I" valence state is referred to. Also, it is to be understood that other alkali halide salts, for example, sodium chloride, can be substituted for the described potassium chloride.

I claim:

1. A source of ultraviolet illumination for use in photometric apparatus, comprising:
   primary source means for radiating ultraviolet light in at least one direction;
   fluorescent means, positioned in said one direction from said primary source means, for emitting light along at least one path having at least some wavelengths substantially within the range of about 270 to 320 millimicrons upon receiving said ultraviolet light from said primary source means;
   said fluorescent means including an article of thallium-activated alkali halide;
   said photometric apparatus including a flow cell positioned in said one path, whereby light from said fluorescent means is directed into said flow cell.

2. A source of ultraviolet illumination according to claim 1 in which said fluorescent means includes means for emitting light having a substantial amount of power at the wavelength of 280 millimicrons upon receiving said ultraviolet light from said primary source means.

3. A source of ultraviolet illumination according to claim 1 in which:
   said article of thallium-activated alkali halide is an elongated crystal having at least one rounded end and a longitudinal axis;
   said longitudinal axis being transverse to said one direction; and
   said rounded end being aligned with said one path, whereby said emitted light is collimated as it leaves said rounded end.

4. A source of ultraviolet illumination according to claim 1 in which said article of thallium-activated alkali halide comprises from $10^{-4}$ to $10^{-6}$ mole fraction of thallium chloride in alkali chloride.

5. A source of ultraviolet illumination according to claim 1 in which said primary source means includes a mercury-vapor lamp radiating light at least one portion of which has a wavelength of 254millimicrons.

6. A source of ultraviolet illumination according to claim 1 further comprising:
   an optical filter disposed between said primary source means and said fluorescent means;

said optical filter transmitting light having a wavelength longer than about 220 millimicrons and absorbing light having a wavelength shorter than about 220 millimicrons.

7. A source of ultraviolet illumination according to claim 1 in which:
said primary source means includes means for shielding said article of thallium-activated alkali halide from heat; and
said fluorescent means includes means for removing heat from the article.

8. A source of ultraviolet illumination according to claim 1 in which said artical of thallium-activated alkali halide is free from organic contamination.

9. A source of ultraviolet illumination according to claim 8 in which said fluorescent means includes:
a sealed tube having at least one wall portion that passes light having a wavelength of substantially 280 millimicrons and at least one wall portion that passes light having a wavelength lower than 280 milimicrons;
said article of thallium-activated alkali halide being mounted in said sealed tube.

10. A source of ultraviolet illumination according to claim 9 in which said fluorescent means further includes:
an inert gas within said sealed tube;
the interior of said sealed tube being free of organic material.

11. A source of ultraviolet illumination according to claim 3 in which:
said article of thallium-activated alkali halide is an elongated crystal and has at least one rounded end and at least one elongated side portion;
said one rounded end being aligned with said one wall portion that passes light having a wavelength of substantially 280 millimicrons; and
said one elongated side portion being aligned with said one wall portion that passes light having a wavelength lower than 280 millimicrons.

12. A source of ultraviolet illumination according to claim 11 in which:
said primary source means includes a mercury vapor lamp; and
said mercury-vapor lamp includes means for radiating light, at least one portion of which has a wavelength of 254 millimicrons.

13. A source of ultraviolet illumination for use in photomeric apparatus. comprising:
primary source means for radiating ultraviolet light in at least one direction;
fluorescent means, positioned in said one direction from said primary source means, for emitting light along at least one path having at least some wavelengths substantially within the range of about 270 to 320 millimicrons upon receiving said ultraviolet light from said primary source means;
said fluorescent means including an article of thalliumactivated alkali halide;
said photomeric apparatus including a flow cell positioned in said one path, whereby light from said fluorescent means is directed into said flow cell: said fluorescent means including a reflector having an elliptical cross-section and two focal axes;
said primary source means including a bright spot;
said bright spot being in one of said two focal axes of said reflector;
the other of said two focal axes of said reflector passing through a portion of said article of thallium-activated alkali halide.

14. A source of ultraviolet illumination according to claim 13 in which said article of tallium-activated alkali halide is free from organic contamination.

* * * * *

UNITED STATES PATENT AND TRADEMARK OFFICE
CERTIFICATE OF CORRECTION

PATENT NO. : 3,887,813
DATED : June 3, 1975
INVENTOR(S) : Robert W. Allington

It is certified that error appears in the above-identified patent and that said Letters Patent are hereby corrected as shown below:

Column 1, line 10, after 280, change "μ" to "mμ".
Column 1, line 18, after the word "that", insert the word "it".
Column 1, line 20, after 280, change "μ" to "mμ".
Column 1, line 24, after 280, change "μ" to "mμ".
Column 1, line 31, after 280, change "μ" to "mμ".
Column 1, line 31, after the word "light", omit the first occurrence of the word "either".
Column 1, line 39, after the word "that", change "the" to "a".
Column 1, line 41, after 280, change "μ" to "mμ".
Column 1, line 53, after 320, change "μ" to "mμ".
Column 1, line 58, change the word "lenses" to "lens".
Column 2, line 1, change the word "particularlly" to "particularly".
Column 2, line 1, after 185, change "μ" to "mμ".
Column 2, line 16, after 220, change "μ" to "mμ".
Column 2, line 16, change the word "whicih" to "which".
Column 2, line 18, change both occurrences of "μ" to "mμ".
Column 2, line 22 and 23, change "thalliumactivated" to "thallium-activated".
Column 2, line 33, change the semicolon to a comma.
Column 2, line 51, change both occurrences of "μ" to "mμ".
Column 3, line 21 and 22, change "in corporated" to "incorporated".
Column 3, line 40, after 280, change "μ" to "mμ".
Column 3, line 54, change the word "cary" to "carry".
Column 3, line 59, after 254, change "μ" to "mμ".
Column 3, line 61, after 320, change "μ" to "mμ".
Column 3, line 63, change the word "flourescent" to "fluorescent".

UNITED STATES PATENT AND TRADEMARK OFFICE
CERTIFICATE OF CORRECTION

PATENT NO. : 3,887,813
DATED : June 3, 1975
INVENTOR(S) : Robert W. Allington

It is certified that error appears in the above-identified patent and that said Letters Patent are hereby corrected as shown below:

Column 4, line 4, after the word "block", insert the word "of".
Column 4, line 19, after 320, change "µ", to "mµ".
Column 4, line 22, remove the period before the quote marks.
Column 4, line 34, after 185, change "µ", to "mµ".
Column 4, line 35, change the word "flluorescent" to "fluorescent".
Column 4, line 39, after 254, change "µ", to "mµ".
Column 4, line 42, after 185, change "µ", to "mµ".
Column 4, line 47, after 185, change "µ", to "mµ".
Column 4, line 49, after 220, change "µ", to "mµ".
Column 4, line 49 and 50, after 220, change "µ" to "mµ".
Column 4, line 50, change "highsilica" to "high-silica".
Column 4, line 68, change the word "utlized" to "utilized".
Column 5, line 7, after 185, change "µ", to "mµ".
Column 5, line 9, change the word "abovementioned" to "above-mentioned".
Column 5, line 10, after 220, change "µ", to "mµ".
Column 5, line 11, after 220, change "µ", to "mµ".
Column 5, line 12, after 280, change "µ", to "mµ".
Column 5, line 29, change the word "causes" to "cause".
Column 5, line 35, after the word "however", place a comma.
Column 5, line 59, after the word "are", omit the word "so".
Column 5, line 68, after 280, change "µ", to "mµ".
Column 6, line 10, after 254, change "µ", to "mµ".
Column 6, line 12, after 185, change "µ", to "mµ".
Column 6, line 68, after the semicolon, add the word "and".
Column 7, line 21, after the semicolon, add the word "and".
Column 7, line 27, after the semicolon, add the word "and".
Column 8, line 6, place a hyphen between the words "mercury" and "vapor".

UNITED STATES PATENT AND TRADEMARK OFFICE
CERTIFICATE OF CORRECTION

PATENT NO. : 3,887,813
DATED : June 3, 1975
INVENTOR(S) : Robert W. Allington

It is certified that error appears in the above-identified patent and that said Letters Patent are hereby corrected as shown below:

Column 8, line 12, after the word "apparatus", remove the period.
Column 8, line 21 and 22, change "thalliumactivated" to "thallium-activated".
Column 8, line 25, change the colon to a semicolon.
Column 8, line 25, a new paragraph should begin with the word "said".
Column 8, line 30, after the semicolon, add the word "and".
Column 8, line 35, change the word "tallium-activated" to "thallium-activated".

Signed and Sealed this

Fourth Day of December 1979

[SEAL]

Attest:

Attesting Officer

SIDNEY A. DIAMOND
Commissioner of Patents and Trademarks